March 30, 1937.  A. A. McCORMACK  2,075,769
SEAL FOR REFRIGERATING APPARATUS
Filed Oct. 24, 1934
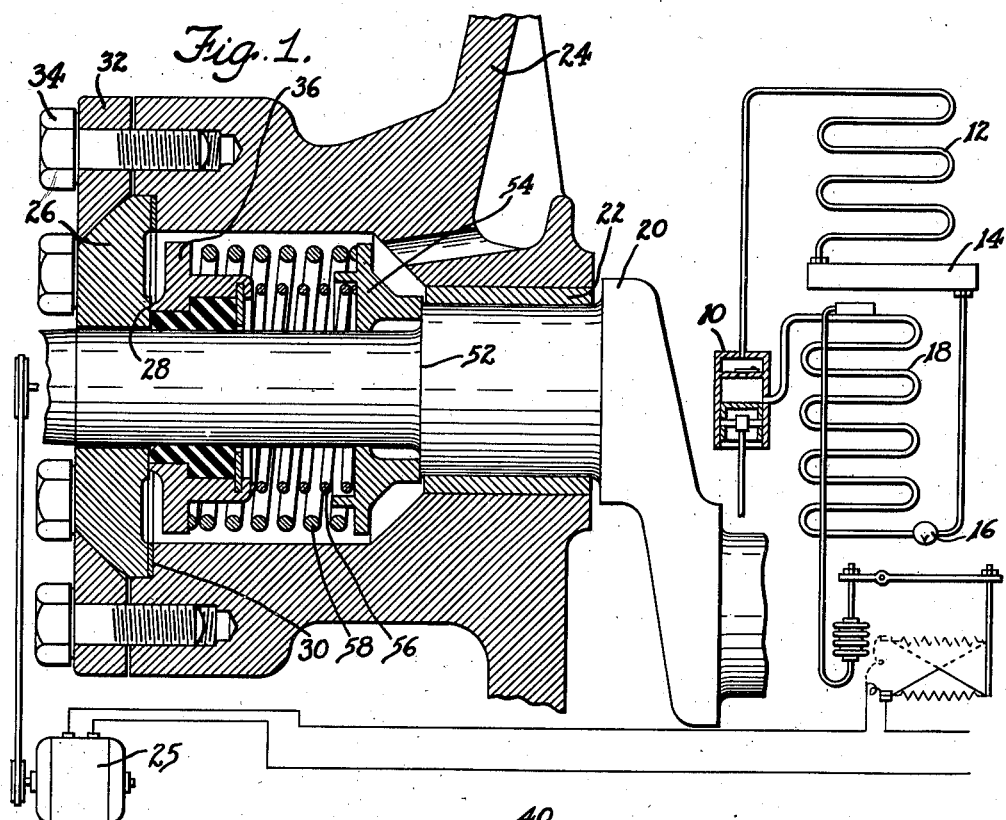
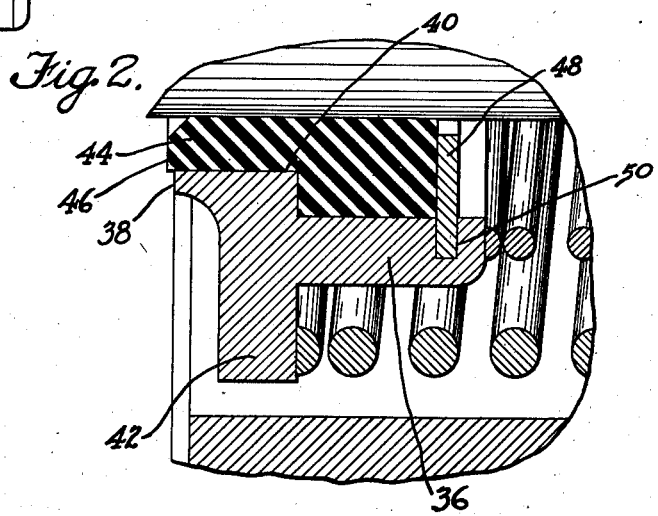
INVENTOR.
ALEX A. McCORMACK
BY
    Spencer Hardman & Fehr
                ATTORNEY.

Patented Mar. 30, 1937

2,075,769

UNITED STATES PATENT OFFICE 2,075,769

SEAL FOR REFRIGERATING APPARATUS

Alex A. McCormack, Dayton, Ohio, assignor to General Motors Corporation, Dayton, Ohio, a corporation of Delaware Application October 24, 1934, Serial No. 749,784

3 Claims. (Cl. 286—7)

This invention relates to refrigerating apparatus and more particularly to shaft seals for a refrigerator compressor.

It is an object of the invention to provide a shaft seal having sealing surfaces, one of which is formed of a resilient material which in operation of the seal is compressed, and to provide means for limiting the compression of the resilient face.

It is also an object to provide a shaft seal having two relatively movable sealing faces, one of which is composite in that the sealing surface comprises both a metallic portion and a portion of resilient material.

A further object is to provide a shaft seal having a resilient packing member, which both acts as a seal between an axially movable sealing member and a compressor member relative to which it is movable and also assists in sealing the running joint of the shaft seal.

Further objects and advantages of the present invention will be apparent from the following description, reference being had to the accompanying drawing, wherein a preferred form of the present invention is clearly shown.

In the drawing

Fig. 1 is a sectional view of a portion of a compressor embodying one form of the present invention and showing diagrammatically the essential elements of a refrigerating apparatus, and Fig. 2 is a fragmentary section corresponding to Fig. 1 on a larger scale.

Referring now to Fig. 1, there is illustrated diagrammatically the essential elements of a refrigerating apparatus which include a compressor 10, a condenser 12, receiver 14, expansion valve 16 and an expansion coil 18 connected in series in the order named which operate to withdraw heat from an object to be cooled into the evaporator 18 and to dissipate the heat from the condenser 12 to the surrounding air or other cooling medium. The compressor has a crank shaft 20 extending through a bearing 22 which forms an aperture in the wall 24 in the crank case of the compressor. Suitable driving means 26 for the compressor are provided to coact with the outwardly extending end of the crank shaft 20 to cause rotation of the same.

In order to effectively seal the joint between the shaft 20 and the wall aperture 22, a shaft seal is provided which comprises a stationary sealing ring 26, preferably formed of a hard metal such as heat treated alloy steel and having a sealing face 28. The ring 26 is sealed to the crank case wall 24 by means of a gasket 30 and a clamping ring 32, which is secured to the crank case wall by bolts 34. An axially movable sealing means is provided comprising a metallic ring 36 which is provided with a sealing or stop face 38, a stepped cylindrical recess 40 and a flange portion 42. Within the recess 40, there is provided a packing member 44 of resilient material which resists the deteriorating action of common refrigerants and lubricants. Such a material, for example, may comprise a polymer of chloro-2-butadiene 1,3, known in the trade as "Duprene" or "Chloroprene". The packing member 44 is so formed that its sealing face 46 projects beyond the sealing face 38 when the member 44 is not compressed. In order to retain the packing member 44 within the recess 40, a retaining ring 48 is secured in the recess 50 at the rear end of the metallic ring 42 as by crimping and maintains the packing member 44 tightly compressed within the recess 40 to seal the joint between the shaft 20 and the metallic ring 36. The shaft 20 is formed with a shoulder 52 against which abuts a spring carrying ring 54. Between the ring 54 and the ring 36 one or more helical springs 56 and 58 are provided to maintain the ring 36 and packing member 44 in engagement with the sealing face 28 of the ring 26. The force of the springs 56 and 58 is preferably such that the packing member 44 is compressed sufficiently to force the sealing face 46 thereof back into the plane of the sealing face 38 of the ring 36.

The operation of the shaft seal is such that during rotation of the shaft 20, the axially movable sealing means including the ring 36 and the packing member 44, together with the springs 56 and 58 and the spring carrying ring 54 are carried with the shaft 20 due to the frictional engagement of the packing member 44 between the shaft 20 and the ring 36 and due to the frictional engagement of the spring carrying ring 54 against the shoulder 52. A running seal is, therefore, formed between the sealing face 28 and the sealing faces 46 and 38. It will readily be seen that the resilient nature of the sealing face 46 provides an efficient seal which is impervious to the passage of refrigerant and lubricant, even after the sealing face 28 has become scored from long usage. It will also be seen that the sealing or stop face 38 of the metallic ring 36 forms a good running seal with the sealing face 28 which normally is sufficiently effective to prevent substantial leakage. It further prevents over-compression of the packing member 44 and permits it to expand and maintain the sealing face 46 in engagement with the sealing face 28 as wear takes place on the sealing face 46 since that face wears at a greater rate than the sealing face 38 wears due to the softer material of which the packing member 44 is formed.

It will thus be seen that there has been provided a shaft seal which will maintain its efficiency in operation throughout a long useful life.

While the form of embodiment of the invention as herein disclosed constitutes a preferred form, it is to be understood that other forms might be adopted, all coming within the scope of the claims which follow.

What is claimed is as follows:

1. A shaft seal including a wall member having a shaft opening therein, a shaft member passing through said shaft opening, one of said members being provided with a sealing surface and the other of said members also having a sealing surface formed thereon, a sealing means for sealing the shaft opening, said sealing means including a sealing surface comprising a metal portion and a resilient rubber-like portion both of which portions are adapted to make sealing engagement with the sealing surface of one of said members, said resilient rubber-like portion of said sealing means having a part thereof also adapted to make sealing engagement with the other of said members, and yielding means for holding both of said portions of said sealing surface of said sealing means in sealing engagement with the sealing surface on one of said members and for holding the said part of the resilient rubber-like portion of the sealing means in sealing engagement with the sealing surface on the other of said members.

2. A shaft seal including a wall having a shaft opening therein, a shaft passing through said shaft opening, said wall being provided with a sealing surface, said shaft having a sealing surface formed thereon, a sealing means for sealing the shaft opening, said sealing means including a sealing surface comprising a metal portion and a resilient rubber-like portion both of which portions are adapted to make sealing engagement with the sealing surface on said wall, said resilient rubber-like portion of said sealing means having a part thereof also adapted to make sealing engagement with the sealing surface on said shaft, and yielding means for holding both of said portions of said sealing surface of said sealing means in sealing engagement with the sealing surface on said wall and for holding the said part of the resilient rubber-like portion of the sealing means in sealing engagement with the sealing surface on said shaft.

3. A shaft seal including a wall having a shaft opening therein, a shaft passing through said shaft opening, said shaft being provided with an annular sealing surface, said wall having an annular sealing surface formed thereon perpendicular to the sealing surface on said shaft, a sealing means for sealing the shaft opening, said sealing means including a sealing surface comprising a metal portion and a resilient rubber-like portion both of which portions are adapted to make sealing engagement with the sealing surface on said wall, said resilient rubber-like portion of the said sealing means having a part thereof extending along and adapted to make sealing engagement with the sealing surface on said shaft, and yielding means for holding both of said portions of said sealing surface of said sealing means in sealing engagement with the sealing surface on said wall and for holding the said part of the resilient rubber-like portion of the sealing means extending along the shaft in sealing engagement with the sealing surface on said shaft.

ALEX A. McCORMACK.